(12) United States Patent
Karunaratne et al.

(10) Patent No.: US 10,962,991 B2
(45) Date of Patent: Mar. 30, 2021

(54) MODULAR MULTI-CHANNEL SYRINGE PUMP

(71) Applicant: Korteks Advanced Sciences, Inc., Escondido, CA (US)

(72) Inventors: Kanchana Sanjaya Gunesekera Karunaratne, Escondido, CA (US); Joseph J. Manno, La Jolla, CA (US)

(73) Assignee: KORTEKS ADVANCED SCIENCES, INC., Escondido, CA (US)

(*) Notice: Subject to any disclaimer, the term of this patent is extended or adjusted under 35 U.S.C. 154(b) by 0 days.

(21) Appl. No.: 16/264,567

(22) Filed: Jan. 31, 2019

(65) Prior Publication Data
US 2019/0234399 A1     Aug. 1, 2019

Related U.S. Application Data

(60) Provisional application No. 62/624,704, filed on Jan. 31, 2018.

(51) Int. Cl.
| | | |
|---|---|---|
| *G05D 7/06* | (2006.01) | |
| *F04B 49/06* | (2006.01) | |
| *F04B 9/02* | (2006.01) | |
| *F04B 17/03* | (2006.01) | |
| *F04B 19/22* | (2006.01) | |

(Continued)

(52) U.S. Cl.
CPC ............ *G05D 7/06* (2013.01); *F04B 9/025* (2013.01); *F04B 17/03* (2013.01); *F04B 19/22* (2013.01); *F04B 23/06* (2013.01); *F04B 39/08* (2013.01); *F04B 49/007* (2013.01); *F04B 49/065* (2013.01); *F04B 49/225* (2013.01); *G05B 19/042* (2013.01); *G05D 7/0688* (2013.01);

(Continued)

(58) Field of Classification Search
CPC ...... F04B 49/065; F04B 39/08; F04B 49/225; F04B 49/007; F04B 23/06; F04B 19/22; F04B 17/03; F04B 9/025; F04B 2201/12; F04B 2201/0201; F04B 49/20; F04B 9/047; F04B 9/04; F04B 13/00; G05B 19/042; G05B 2219/2658; G05D 7/06; G05D 7/0688
USPC ........................................................ 700/282
See application file for complete search history.

(56) References Cited

U.S. PATENT DOCUMENTS 4,333,340 A * 6/1982 Elmeskog ............ A61B 5/1107
                                                                482/133
4,520,842 A * 6/1985 Elliott ........................ F16K 1/42
                                                                137/327

(Continued)

FOREIGN PATENT DOCUMENTS

WO     WO2000066269 A1 * 11/2000

*Primary Examiner* — Chun Cao
(74) *Attorney, Agent, or Firm* — Eleanor Musick; Musick Davison LLP

(57) ABSTRACT

A modular multi-channel syringe pump assembly includes a chassis in which are mounted two or more parallel syringe banks. Each syringe bank includes a syringe for retaining a fluid in a chamber with a syringe plunger for drawing fluid into or forcing fluid out of the chamber. A syringe drive actuator includes a syringe drive motor and a mechanical linkage for activating the syringe. At least one position sensor detects syringe position and generates a position signal corresponding to the syringe position. A controller receives the position signal for each syringe bank and generates control signals for operation of the two or more syringe banks.

24 Claims, 14 Drawing Sheets

(51) Int. Cl.
    *F04B 23/06*      (2006.01)
    *F04B 49/00*      (2006.01)
    *F04B 49/22*      (2006.01)
    *G05B 19/042*     (2006.01)
    *F04B 39/08*      (2006.01)

(52) U.S. Cl.
    CPC .. *F04B 2201/12* (2013.01); *G05B 2219/2658* (2013.01)

(56) References Cited

U.S. PATENT DOCUMENTS

| | | | |
|---|---|---|---|
| 6,668,466 B1* | 12/2003 | Bieg | G01B 5/008 |
| | | | 33/1 PT |
| 2002/0192090 A1* | 12/2002 | Du | E21B 43/128 |
| | | | 417/423.11 |
| 2005/0194407 A1* | 9/2005 | Bach | B01L 3/0206 |
| | | | 222/309 |
| 2008/0058146 A1* | 3/2008 | Pizzichil | F04D 13/022 |
| | | | 475/72 |
| 2008/0183307 A1* | 7/2008 | Clayton | H05B 47/175 |
| | | | 700/8 |
| 2009/0122439 A1* | 5/2009 | Abramovitch | G11B 5/5582 |
| | | | 360/77.02 |
| 2009/0301231 A1* | 12/2009 | Wang | B01L 3/0265 |
| | | | 73/864.11 |
| 2010/0194841 A1* | 8/2010 | Tsujino | B41J 2/451 |
| | | | 347/224 |
| 2016/0213856 A1* | 7/2016 | Despa | A61M 5/31568 |
| 2017/0021951 A1* | 1/2017 | Teague | B65B 3/003 |
| 2018/0252213 A1* | 9/2018 | Afshari | F04C 11/00 |

* cited by examiner

Thermal expansion effects from center of pump
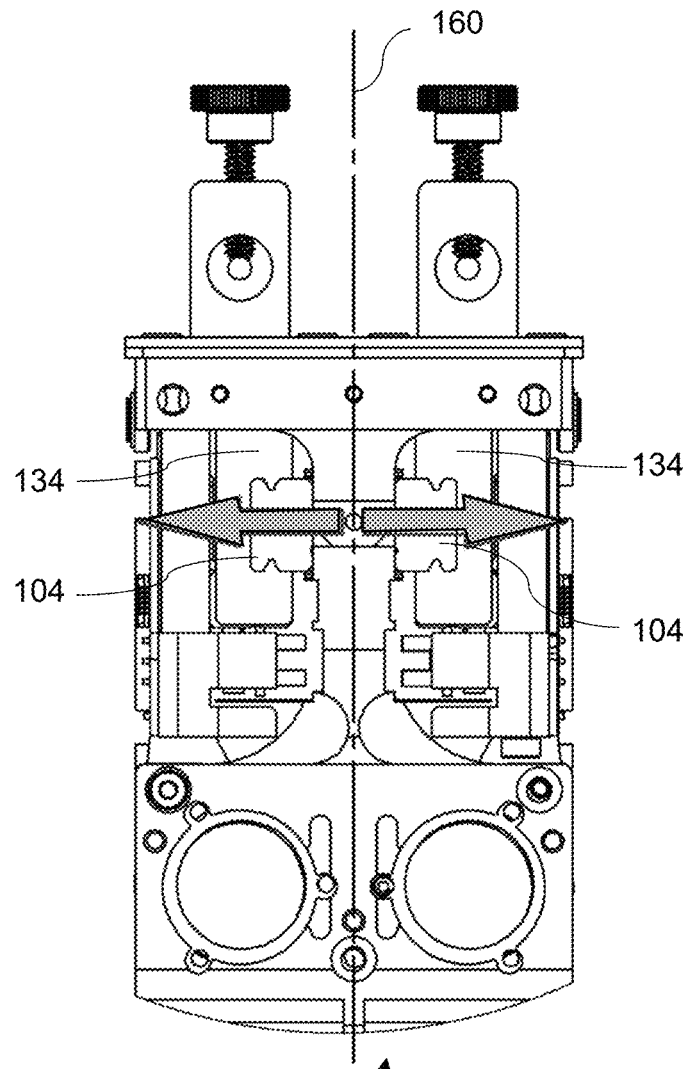
FIG. 2D
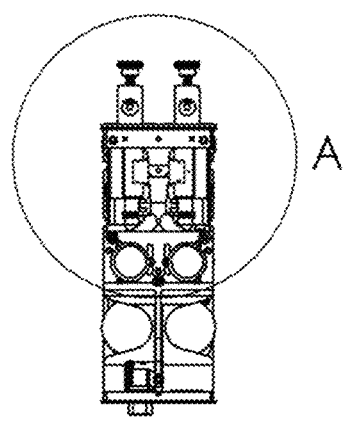

MODULAR MULTI-CHANNEL SYRINGE PUMP

RELATED APPLICATIONS

This applications claims the benefit of the priority of U.S. Provisional Application No. 62/624,704, filed Jan. 31, 2018, which is incorporated herein by reference in its entirety.

FIELD OF THE INVENTION

The present invention relates to a precision metered syringe pump module capable of multi-channel operation.

BACKGROUND

Syringe pumps are widely used in a variety of applications for precisely transferring liquid samples and reagents, bulk dispensing, diluting, pipetting, and other processes where accurate liquid handling of small liquid volumes (e.g., picoliter to milliliter) is required. A non-exhaustive list of applications for syringe pumps includes pharmaceutical compounding, microinjection, infusion and drug delivery, microfluidics, chemical synthesis, mass spectrometry, and flow cytometry. The amount of liquid discharged and drawn-up by a syringe pump is determined by the amount of movement of a plunger, and drive screws are generally used as the driving mechanism therefor. Driving apparatuses that discharge and draw up liquid in multiple flow paths by connecting multiple syringe pumps in parallel and driving them simultaneously, i.e., multi-channel pumps, are also known, and are widely used in automated and robotic laboratory systems such as those used for analytical chemistry, molecular and in-vitro diagnostics, assays, food laboratory, flow cytometry, and other applications. One example of such a pump apparatus is disclosed in U.S. Pat. No. 7,361,157, which is incorporated herein by reference.

The field of fluidic precision metered pumping is relatively mature. Existing commercially-available devices are offered in configurations of a single channel, or multiple channels, i.e., 2, 3, 4-8 and even 16 channels. These devices, in general, are configured in a standard size. For independent control of multiple channels, the typical approach is to use multiple syringe pump assemblies. For synchronized flow, the approach is to drive multiple syringes with a single drive motor or assembly or to use synchronized electronics and sensors to match flow performance in an open or closed control loop. This can be limiting in situations in which it becomes necessary to provide multiple independently-driven syringes or multiple banks of syringes in the same assembly to provide precise coordinated yet independent motion of the fluids dispensed.

Traditional pumps are defined by their stroke. For example, the designation "3000" corresponds to 30 mm of travel, and "6000" corresponds to 60 mm of travel, where the specified travels correlate to the available syringe sizes. CAVRO®/Tecan Trading AG, Parker Hannifin Corp, Kloehn/Norgren, Hamilton, and TriContinent/Gardner are major commercial suppliers of such precision syringe pumps. The products available from these manufacturers include one-channel independent pumps as well as 2-, 4-, and 8-channel linked motion pumps in which a single motor controls all of the syringes. Currently-available independently-controlled multi-channel devices tend to be an amalgam of multiple discrete single channel devices as opposed to a true multi-channel device.

One problem that frequently occurs when attempting to precisely dispense two or more liquids using discrete syringe pumps is that thermal expansion and variations in manufacturing tolerances of the individual assemblies cause the relative displacements of the two syringes to vary, even when being used for similar operations. A similar problem arises where multiple independently-controlled syringes cannot be synchronized to an appropriate degree of precision to perform similar or complementary functions as a result of their independent components and tolerances. This is typically because the controllers are physically, electrically or logically independent of one another. One approach to avoid the problem of multi-channel pump matching is to control all pumps with the same controller in such a manner as to cause synchronization of motion and, thus, fluid flow.

SUMMARY

The present invention provides a solution to the problems of multi-channel pump matching by mounting the driving assemblies within the same chassis in a symmetrical way, so that the effects of temperature variations are identical on both assemblies, and so that the effects of manufacturing tolerances are matched from channel to channel. Mounting two or more syringes to a common plate or structure also has the added advantage of reducing the physical size of the pump, compared to mounting syringes to a box like structure or mounting multiple discrete syringes adjacent to one another.

According to an embodiment of the invention, a method and apparatus are provided for symmetric and uniform n-channel fluid pumping. The advantage of the inventive approach is that each channel is unique and addressable while sharing similar physical characteristics to other channels, leading to a commonality in system fluctuations such as from temperature and general manufacturing tolerances. Because each channel is independently controllable, yet still matched in performance, various synchronized and unsynchronized motions are possible, offering advantages of positive displacement pumping but with continuous flow, fixed proportion flow (achievable either by pump speed and/or by different syringe barrel diameters).

The inventive modular multi-channel pump design allows for independent but synchronized or linked control of two or more pump channels. This is coupled with the advantage that multiple pumps occupy less physical space than before. Further, the housing of all syringes in the same assembly causes any changes in dispensing to be matched due to the fact that all mechanisms are at the same temperature and manufactured to the same tolerances.

Using standard techniques, the high density pump unit can be assembled in different configurations and combinations. For example, each channel can be independent, or some number of channels can be ganged together for operation in concert. Thus, any combination of configuration could be possible.

In one embodiment, a twinned-type design is used in which each half is a mirror image of the other. In another embodiment, an n-channel device can be manufactured relatively more easily, offering the same benefits as the mirror-symmetric design using translational symmetry, wherein all components and features from unit to unit are identical and built into the same integrated assembly to enable thermal matching as well as mechanical tolerance matching.

In one aspect of the invention, a multi-channel syringe pump assembly includes a chassis; two or more independently driven syringe banks mounted in parallel within the chassis, each syringe bank comprising: an actuator; a motor controlled by the actuator; a syringe configured for retaining a fluid in a chamber and a syringe plunger for drawing the fluid into or forcing the fluid out of the chamber, the syringe further configured to be activated by one of the actuator and motor; and a controller for controlling the two or more syringe banks. Each syringe bank may further comprise a linear distance measuring devices such as linear encoders that are sensitive to the linear motion of the syringe plungers or banks of syringe plungers. Each syringe or syringe bank may also include a valve assembly with the ability to direct the flow of fluid from each syringe or syringe bank to two or more paths. An encoder may be configured to sense the valve position relative to the ports which are fluidically connected. One or more valve actuators may be a rotary gearmotor connected to one or more valve assemblies. A gear train may be included in each syringe bank disposed between one of the actuator and motors and the driven elements. The actuator and motor or each syringe bank may be driven in concert or independently by a one or more motion controlling microprocessors or other control circuits that are devised to work in strict synchronization or in an independent fashion.

In another aspect of the invention, a multi-channel syringe pump assembly includes a chassis; two or more syringe banks mounted in parallel within the chassis, each syringe bank comprising: a syringe configured for retaining a fluid in a chamber, the syringe comprising a syringe plunger configured for drawing the fluid into or forcing the fluid out of the chamber; a syringe drive actuator comprising a syringe drive motor and a mechanical linkage configured for activating the syringe; at least one position sensor configured for detecting and generating a position signal indicative of a position of the syringe; and a controller for receiving the position signal for each syringe bank and generating control signals for operation of the two or more syringe banks. In some embodiments, the at least one position sensor is a linear motion sensor configured for measuring relative movement of the syringe and the syringe plunger. The linear motion sensor may be an optical encoder disposed on the mechanical linkage of the syringe drive actuator configured for detecting gradations on an encoder tape disposed in a fixed relationship to the chassis. The position sensor may also be an optical detector disposed in a fixed relationship to the chassis and configured for detecting a position of a portion of the mechanical linkage of the syringe drive actuator.

In one embodiment, the mechanical linkage may be bearing block configured to slidably move along a linear rail fixedly mounted relative to the chassis. In another embodiment, the mechanical linkage may be a bearing block configured to slidably move along a round shaft fixedly mounted relative to the chassis. The motor may be configured to axially rotate a lead screw to convert rotation of the screw to vertical motion of a lead nut connected to the mechanical linkage.

Each syringe bank may further include a valve assembly in fluid communication with the syringe, where the valve assembly is configured for controlling flow of fluid from the syringe, the valve assembly including a valve in fluid communication with at least one valve port. The valve assembly may further include a valve encoder configured to sense a position of the valve relative to the at least one valve port. One or more valve actuators may be provided to activate the valve assembly. In some embodiments, the valve assembly is removably and replaceably attached to the syringe bank to allow replacement of the valve assembly. The syringe may also removably and replaceably disposed within the syringe bank to allow replacement. The syringe drive actuators of the two or more syringe banks are configured to respond identically to thermal effects. The two or more syringe banks may be disposed within the chassis in a mirror-symmetric configuration or using translational symmetry.

Each syringe bank should be separately electronically addressable to allow it to be driven in concert or independently by the controller. The controller includes a processor and an associated memory having instructions stored therein to cause the processor to execute a positioning algorithm using the position signal for controlling operation of the syringe drive actuator based on one or more of a lookup table and a map. In some embodiments, the controller is a single controlling element configured to control at least two syringes, wherein the controller executes an algorithm to link actuation of one syringe to actuation of at least one other syringe.

In yet another aspect of the invention, a multi-channel syringe pump assembly includes a chassis, two or more syringe banks mounted in parallel within the chassis, where each syringe bank includes a syringe configured for retaining a fluid in a chamber, the syringe comprising a syringe plunger configured for drawing the fluid into or forcing the fluid out of the chamber, a syringe drive actuator comprising a syringe drive motor and a mechanical linkage configured for activating the syringe, wherein the mechanical linkage comprises a bearing block configured to slidably move along a linear rail or a round shaft fixedly mounted relative to the chassis, a linear motion sensor configured for measuring relative movement of the mechanical linkage and generating a position signal indicative of a position of at least a portion of the mechanical linkage along a length of the linear rail or round shaft; and a controller for receiving the position signal for each syringe bank and generating control signals for operation of the two or more syringe banks.

BRIEF DESCRIPTION OF THE DRAWINGS

FIGS. 2C and 2D diagrammatically illustrate the comparative thermal effects for the embodiments of FIGS. 2B and 2A, respectively.

DETAILED DESCRIPTION OF EMBODIMENTS OF THE INVENTION

Figure 1A:
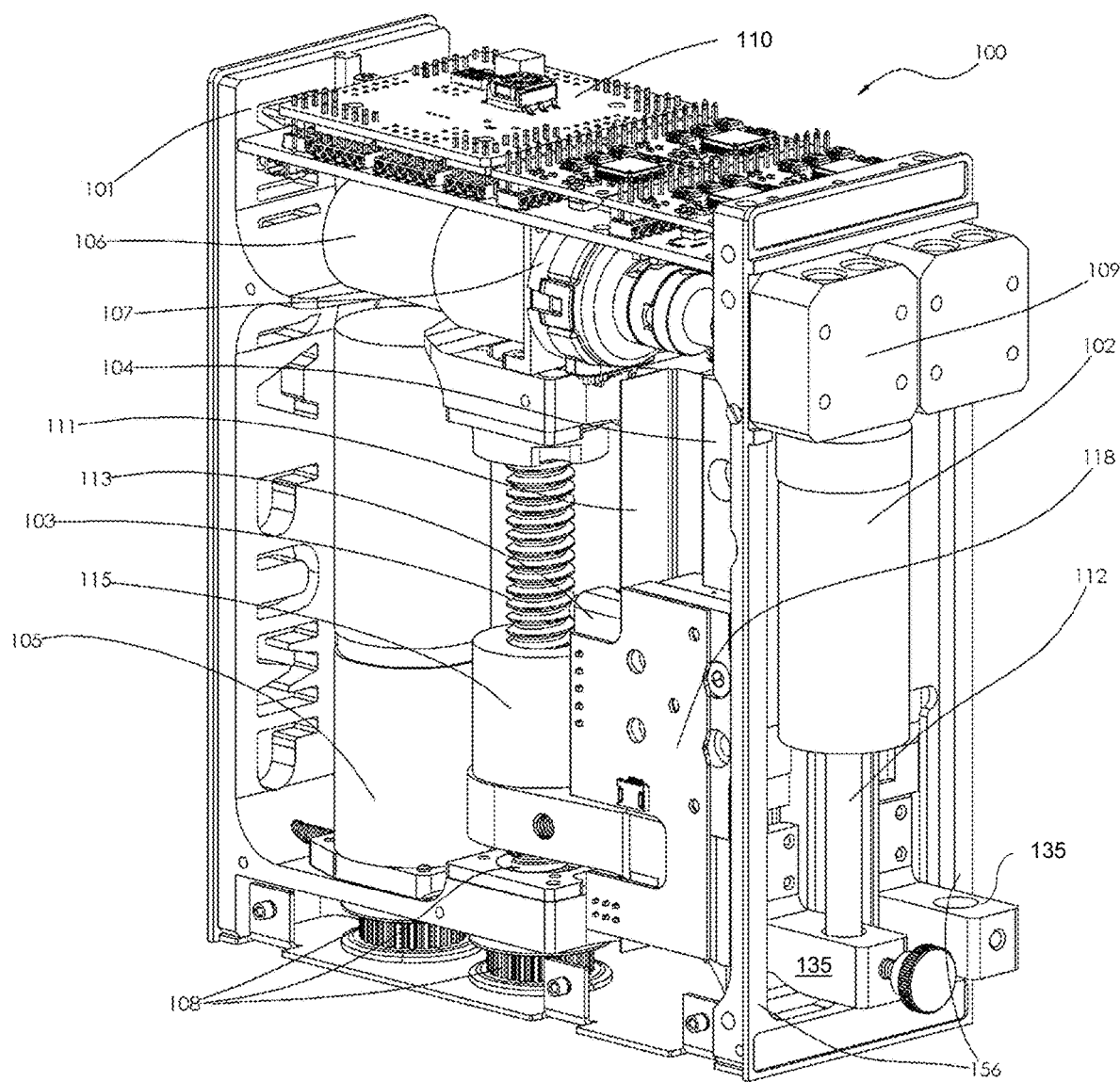
FIG. 1A is a perspective view of an embodiment of the inventive pump assembly.

The following detailed description and the accompanying drawings relate to exemplary embodiments of the invention. After review of the following detailed description, it will be apparent to those of skill in the art that other variations and combinations are possible based upon the principles and features disclosed herein. Accordingly, the specific examples described herein are not intended to be limiting. Furthermore, description of elements as having a "top" or "upper portion", or a "bottom" or "lower portion," is intended solely to provide reference to the features as illustrated in the figures, and is not intended to suggest that a particular orientation of the assembly is required.

Embodiments of the syringe pump assembly 100 are illustrated in FIGS. 1A-4. The basic components of the pump and their corresponding reference numerals in the figures are listed in Table 1.

TABLE 1

| Ref. No. | Description |
| --- | --- |
| 100 | syringe pump assembly (1$^{st}$ embodiment) |
| 101 | main chassis |
| 102 | syringe |
| 103 | leadscrew |
| 104 | linear slide |
| 105 | syringe drive |
| 106 | valve drive |
| 107 | rotary encoder for valve drive |
| 108 | gear train |
| 109 | valve |
| 110 | control logic system |
| 111 | linear encoding tape |
| 112 | syringe plunger |
| 113 | linear encoder read head |
| 115 | lead nut |
| 118 | linear guide carriage assembly |
| 128 | lower carriage bracket |
| 130 | carriage circuit board |
| 132 | upper carriage bracket |
| 133 | carriage channel |
| 134 | linear guide bearing block |
| 135 | syringe plunger connection |
| 136 | syringe plunger opening |
| 137 | drive nut attachment extension/lower carriage bracket |
| 138 | drive nut attachment threads |
| 139 | carriage connector |
| 140 | slotted opto sensor for coarse homing |
| 142 | set screw hole |
| 150 | optical gradations on linear encode tape |
| 152 | precision home marking on linear encoder tape |
| 156 | syringe frame |
| 160 | centerline |
| 162 | carriage circuit board connector |
| 200 | syringe pump assembly (2$^{nd}$ embodiment) |
| 201 | precision shaft |
| 202 | sleeve bearing |
| 218 | shaft carriage assembly |
| 228 | lower carriage bracket |
| 235 | syringe plunger connection |
| 236 | syringe plunger opening |
| 237 | syringe set screw |
| 254 | lower shaft support plate |
| 256 | syringe frame |
| 260 | centerline |

TABLE 1-continued

| Ref. No. | Description |
| --- | --- |
| 262 | arrows |
| 300 | syringe pump assembly (3$^{rd}$ embodiment) |
| 301 | main chassis |
| 302 | syringe |
| 303 | leadscrew |
| 304 | linear slide |
| 306 | valve drive |
| 307 | rotary encoder for valve drive |
| 309 | valve |
| 312 | syringe plunger |
| 313 | linear encoder read head |
| 315 | lead nut |
| 318 | linear guide carriage assembly |
| 332 | carriage bracket |
| 334 | linear guide bearing block |
| 335 | syringe plunger connection |
| 337 | drive nut attachment connection |
| 340 | opto sensor for coarse homing |
| 354 | horizontal support plate (frame) |
| 358 | vertical support (frame) |
| 359 | vertical support (frame) |
| 362 | linear encoder read head connector |
| 365 | linear rail and cable support |
| 370 | rotary encoder read head |
| 374 | rotary coarse homing slot sensor |
| 385 | linear rail retention opening |

The main chassis 101 is the framework of the pump to which components of the inventive syringe pump assembly are attached. The main chassis 101 may be formed using a number of smaller parts, e.g., side panels, beams, and/or supports, that are assembled together by conventional assembly means such as screws or other fasteners, or may be made up of a single larger complex part, or a mix of some complex parts and some simple parts that are formed by machining, molding, or a combination thereof. In an exemplary embodiment, the chassis 101 is formed from aluminum, stainless steel, or other appropriate metal, or from a rigid plastic or polymer. The dimensions and modular construction of the syringe pump assembly allows two or more pump channels to be "plugged" into a laboratory instrument or system originally designed to receive a single OEM pump module.

Syringe 102 is an industry standard syringe. In one embodiment, this syringe may be 30 mm long, however, 60 mm may also be used with minor modifications to the assembly. Syringes are available in a number of diameters. Stroke and diameter determine the volume available to be pumped by the unit in a single stroke. Typical volumes are 500 µL to 10 mL. Syringes typically consist of a chamber with an attached screw fitting that is screwed into the valve body. The syringes will preferably be separable from the assembly to allow user replacement of the syringe.

Figure 1B:
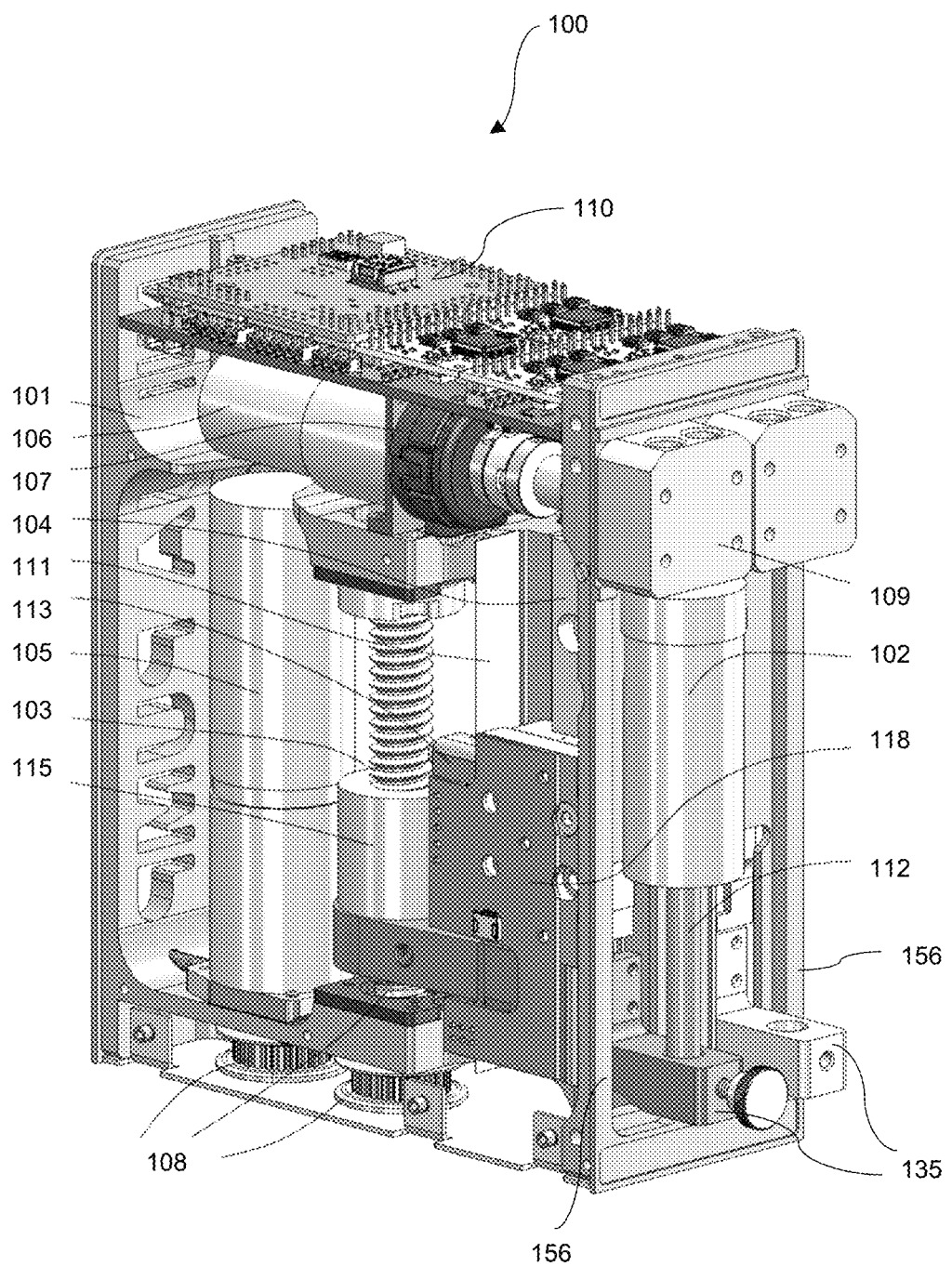
FIGS. 1B and 1C are perspective views of the pump assembly of FIG. 1A with shading to highlight the components of the assembly.
Figure 1C:
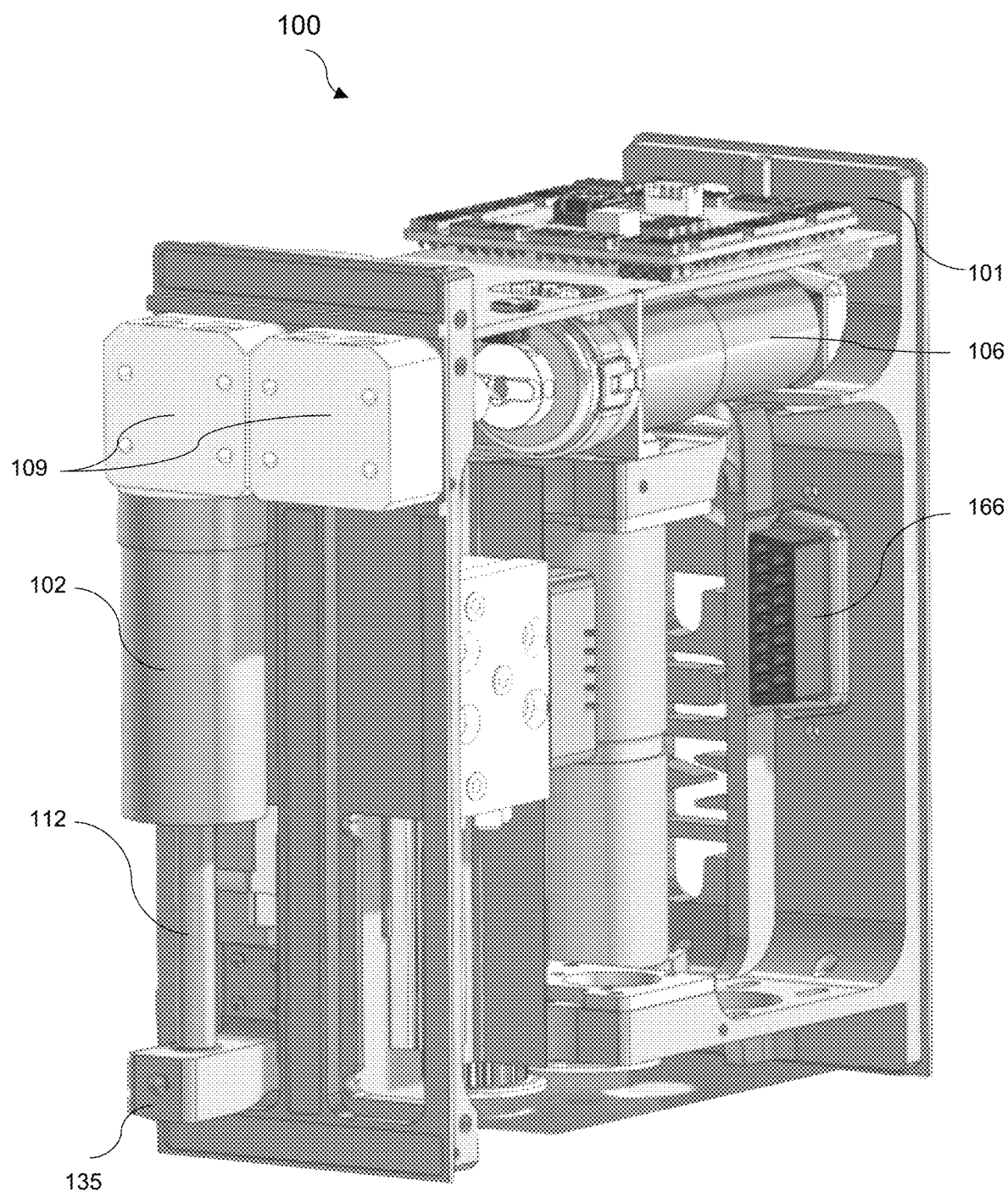
Figure 1D:
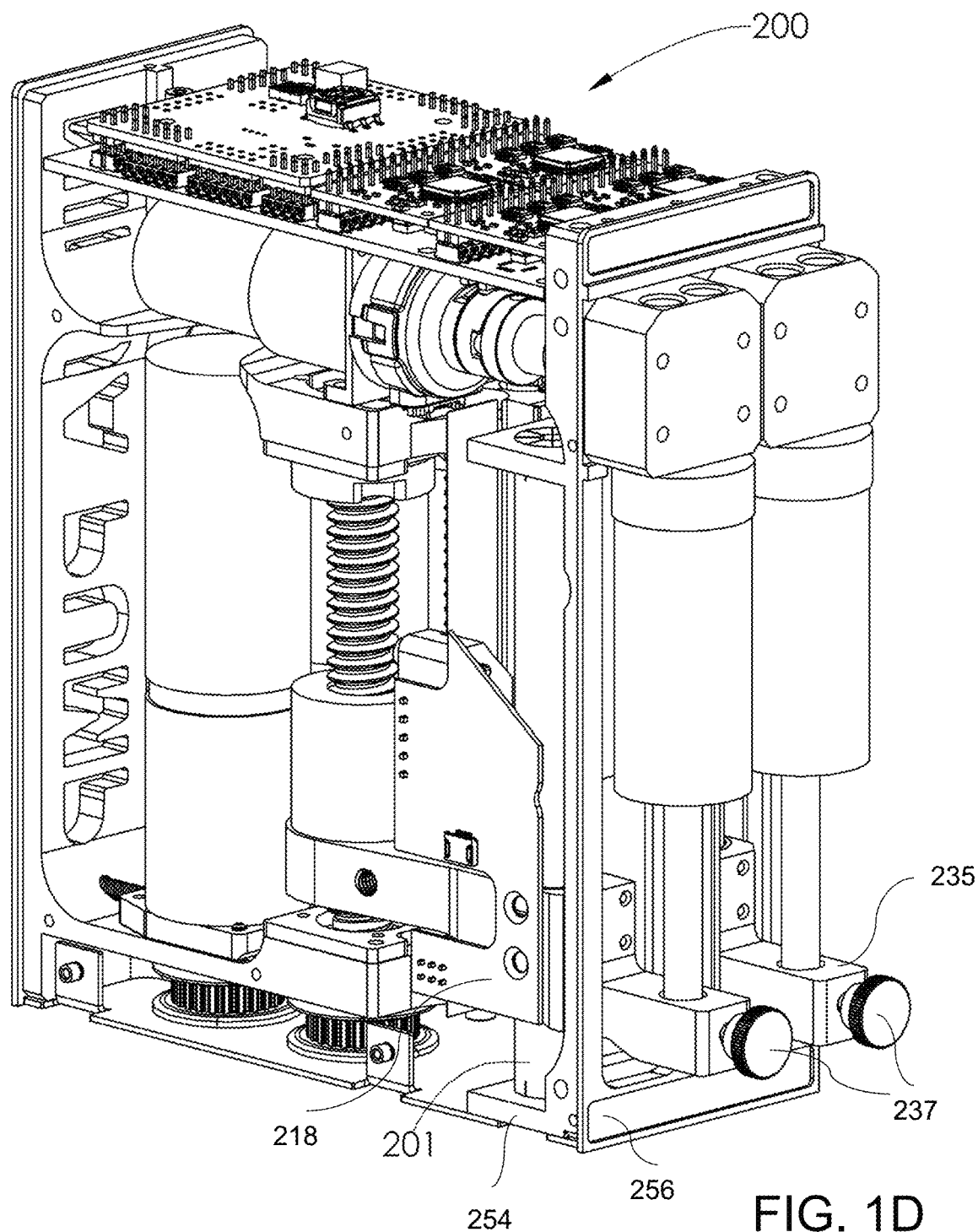
FIG. 1D is perspective view of an alternative embodiment of the inventive pump assembly employing a shaft in place of the linear rail of FIGS. 1A-1C.
Figure 1E:
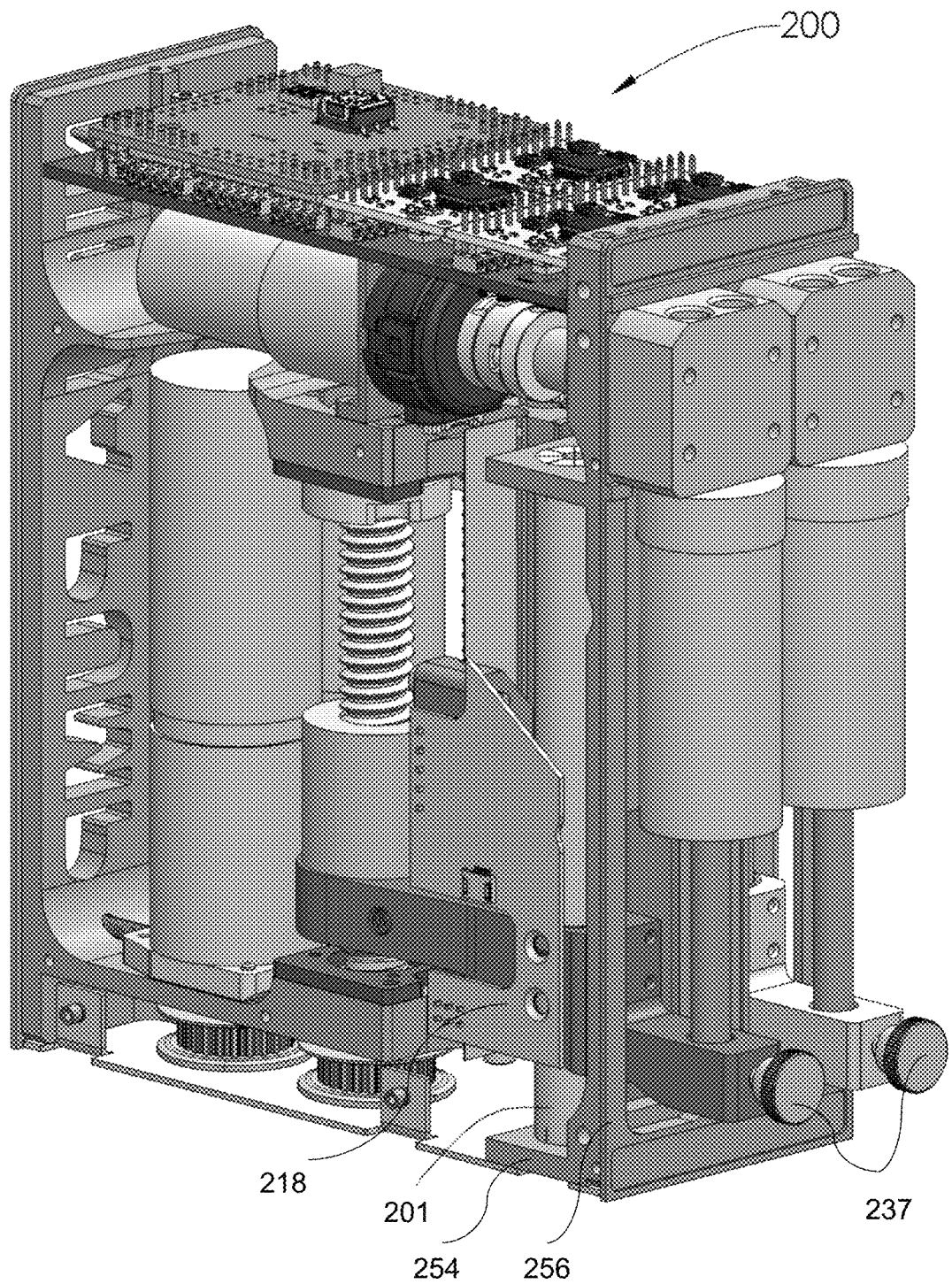
FIG. 1E is a perspective view of the embodiment of FIG. 1D with shading to highlight the components of the assembly.

Inserted into the syringe chamber is the plunger 112 which includes a shaft and a plug portion (not shown) that is preferably formed from an inert and pliable material that is sufficiently elastic to generate a slidable seal against the inner walls of the plunger. In the illustrated examples, the plunger 112 is configured to slide within the syringe chamber to reduce or expand the inner chamber volume to expel or draw liquid into the chamber, respectively. In some embodiments, the syringe assembly may be reversed so that the syringe chamber moves while the plunger is static. The syringe chamber may include a threaded central port at its upper that is the portion that is screwed into the valve 109. It should be noted that FIGS. 1A-1C illustrate a single syringe 102 within the assembly. While the syringe bracket 135 for a second syringe is shown in FIGS. 1A and 1B, a second syringe is not shown to allow support structures to be easily seen. The syringe plunger 112 may be held in place within bore 136 by a set screw. Alternatively, the syringe plunger may be held in place on the syringe bracket by one or more magnets (not shown).

In one embodiment, a twinned-type design is used in which each half of the assembly is a mirror image of the other. In another embodiment, an n-channel device can be manufactured relatively easily, offering the same benefits as the mirror-symmetric design using translational symmetry, wherein all components and features from unit to unit are identical and built into the same integrated assembly to enable thermal matching as well as mechanical tolerance matching.

Leadscrew 103, seen in FIGS. 1A and 1B, is an industry standard leadscrew with a slidable leadnut 115. Leadnut 115 is internally threaded to move up and down along the axis of the leadscrew 103 when the leadscrew is rotated. The leadnut may optionally be an anti-backlash type nut to reduce the backlash that often produces inherent slop in a mechanical assembly. In the present design, an ABN (anti backlash nut) can help, however, backlash can also be managed through other means. Traditional designs depend on an ABN to reduce pumping errors, but most ABN's drift or require adjustment over time. The inventive assembly addresses drift through use of a linear encoder (111, 113) on each syringe plunger combined with closed loop feedback. This feature is described further below. Rotation of leadscrew 103 by gear train 108 drives linear carriage assembly 118, attached to leadnut 115, up and down to move the syringe plunger 112 (or syringe chamber 102). The leadscrew 103 may be coated with various antifriction coatings to ensure smooth rotation.

In some embodiments, accuracy can be improved by employing a ball screw type assembly. While this variation is not shown separately, such mechanical actuators are known and it would be within the level of skill in the art to incorporate such a drive in the inventive assembly. Recirculating ball designs possess several advantages over standard leadscrews including increased accuracy due to higher rigidity and reduced friction, which reduces wear over time. Preloaded assembly is also possible. The disadvantages are that these assemblies tend to be more expensive, require lubrication, can be noisy, and are bulkier.

Figure 2A:
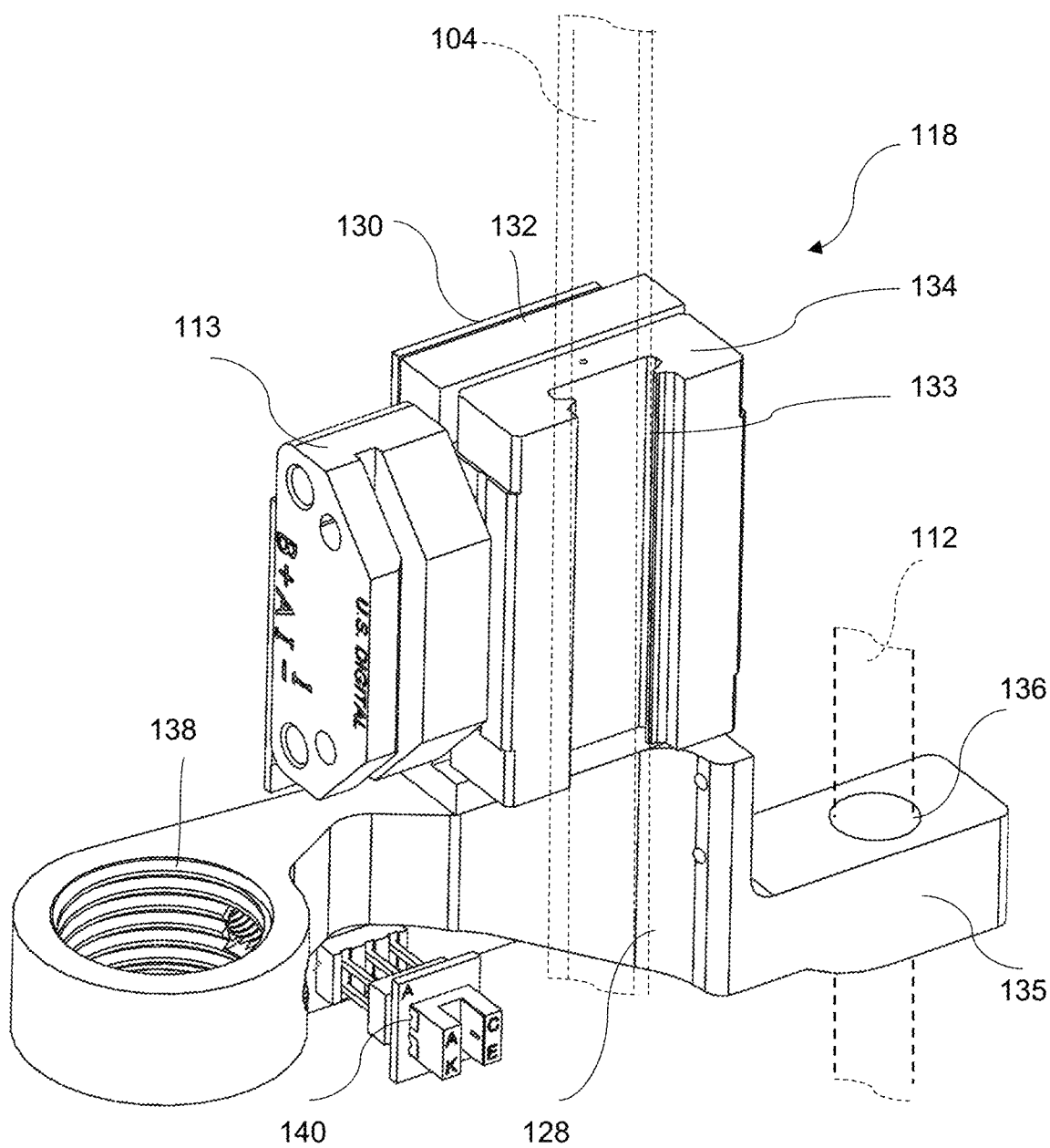
FIG. 2A is a front perspective view of an embodiment of the carriage assembly.
Figure 3:
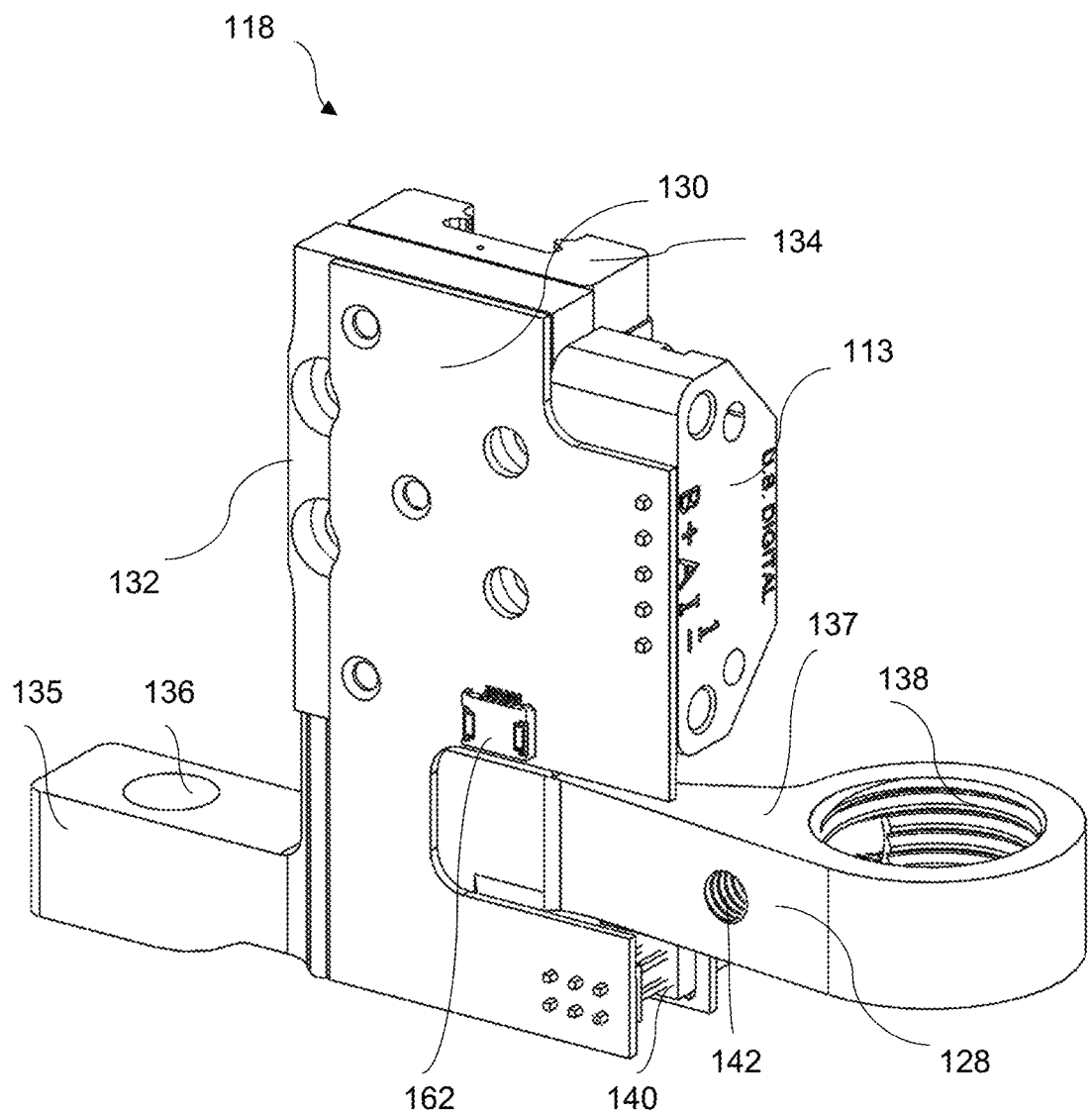
FIG. 3 is a rear perspective view of an embodiment of the carriage assembly of the pump.

The details of linear slide assembly 118 are shown in FIGS. 2A and 3. Referring first to FIG. 2A, the slide assembly 118 converts the rotation of the screw 103 to the linear motion required to compress or expand the syringe. In one embodiment, an industry standard linear rail 104 (shown by dashed lines) is used to guide the motion of the linear slide bearing block 134, which has a channel 133 formed therein to closely and stably slide along the rail 104. Upper carriage bracket 132 attaches the elements that drive the syringe to the linear slide bearing block 134. Lower carriage block 128 is a machined bracket attached at the bottom of upper carriage bracket 132 to rigidly tie the drive nut 138, bearing block 134, and syringe plunger 112 (inserted into bore 136) together. This assembly ensures that motion of the plunger is accurate and rigid. The linear slide assembly 118 includes a recirculating ball bearing path and uses precision ground surfaces to control the precise motion of the carriage with one degree of freedom.

Referring to FIG. 3, attached to the backside of linear slide assembly 118 is circuit board 130, which connects linear encoder read head 113 and opto sensor 140 to a connector 162 for communication with the control logic system. In one embodiment, connector 162 is a 6 pin connector. Threaded bore 142 receives a set screw (not shown) which is inserted to prevent the lead nut 115 from unscrewing.

The advantages to using a linear ball slide coupled with a leadnut assembly include that the leadnut 103 allows a minor amount of variability such that the specific axis of motion need not be precisely aligned with the screw axis. To some extent, this relaxes manufacturing tolerance in a design that would otherwise require very tight tolerances. Additional features of the inventive design that are discussed below further alleviate the need for rigid manufacturing tolerances.

Linear ball slides have the following features: a precision formed (or ground) track rail; a precision manufactured carriage with several pathways for balls to circulate, providing for smooth precise motion. Balls can be graded to provide greater or lesser fits (tightness of motion). Balls require lubrication, although carriages are available that offer extended lubricating properties.

The slides can be made using a round shaft or complex geometries based on design requirements. In one embodiment, a round shaft design may be used for carriage assembly 218. In this embodiment, shown in FIGS. 1D, 1E, and 2B, the linear rail mechanism described above is replaced with a precision shaft 201 and sleeve or ball bearing 202 for constraining the linear motion of the drive axis and transferring force to the syringe plunger. All other components of the slide assembly are the same as described above except that the carriage block is not needed and the carriage bracket is configured to attach directly to the syringe slide/lower carriage block 228. Asymmetric features of the linear rail slide embodiment, while offering significant improvement over prior art approaches, may experience slight mechanical thermal variation when taking into account the lateral symmetry of the design. On the other hand, the symmetry of the cylindrical shaft 201 and bearing 202 advantageously reduces lateral forces on the syringe body, thus reducing errors that may occur due to thermal and mechanical effects.

Figure 2B:
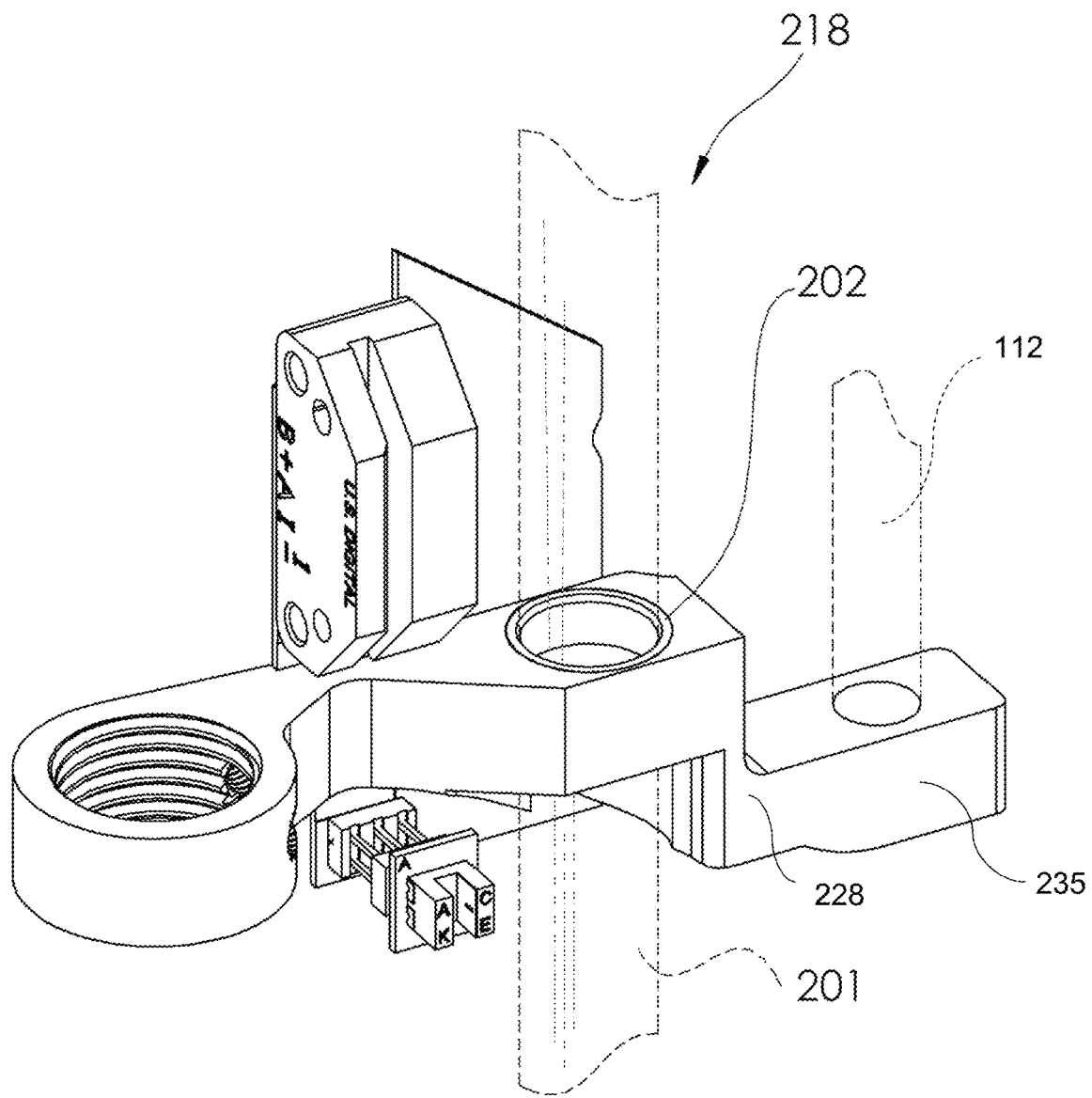
FIG. 2B is a front perspective view of an alternative embodiment of the carriage assembly of the embodiment of FIGS. 1D and 1E.
Figure 2C:
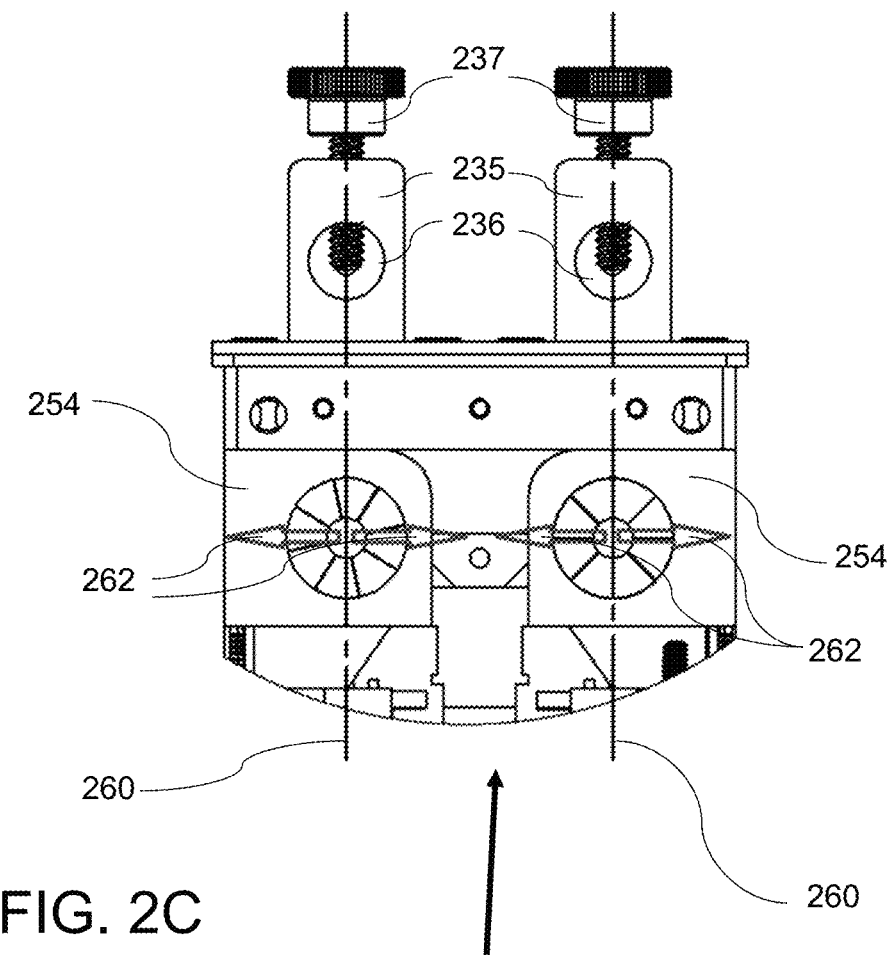
Figure 2C:
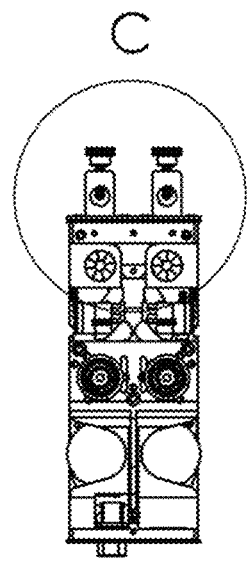

FIGS. 2C and 2D are bottom views of the pump assembly embodiments of FIGS. 2B and 2A, respectively. These figures diagrammatically illustrate the comparative (hypothetical) thermal effects for each embodiment. In FIG. 2C, the upper figure shows the details of the components within circle C of the lower image, including the syringe brackets 235 with syringe bores 236 and set screws 237. For clarity, syringes are not included in this figure. Shaft 201 is supported by lower plate 254 attached to syringe frame 256. Each shaft 201 and its corresponding syringe plunger (as represented by syringe plunger bore 236) are symmetrically aligned relative to centerline 260, as indicated by arrows 262. Use of this symmetric positioning reduces asymmetric forces, leading to improvements in accuracy as well as syringe longevity. It is believed that this more symmetric approach can reduce the thermal expansion or mechanical variations by as much as one-half, leading to more accurate dispensing as well as an extended syringe life. In comparison, FIG. 2D shows a corresponding view of the linear rail design of FIGS. 1A, 1B, and 2A, with the details of the components within circle A of the lower image shown in the upper figure. While this arrangement still exhibits symmetry between the two syringe sub-assemblies relative to centerline 160 and, therefore, will benefit from uniform thermal expansion relative to the centerline 160, it does not receive the further benefit of the additional symmetry along the shafts along centerline 260 in FIG. 2C. In addition, the use of a shaft and bearing combination facilitates the implementation of assemblies with more than two channels, e.g., 4, 8, 16, or more independent channels, in a single body. Such expansion could be a challenge with the linear rail design of FIG. 2A.

Alternative approaches to reducing variation include use of low-friction or controlled-friction sliding equivalents that employ specific material sliding properties rather than recirculating elements.

Syringe drive (motor) 105 provides the driving force for the syringe plunger 112 to effect its motion and thus, pumping (or suction). Any conventional method of performing mechanical work may be used. Typically, a rotary stepper motor is used, coupled either directly to a screw drive or via a gearbox. In other implementations, the driving may be effected via rack and pinion, with or without an intermediate gearbox. Brushless motors may be used for greater precision by employing closed loop feedback to control the motion. In one embodiment, of the inventive pump assembly, a brushless DC servo motor is used. Stepper motors typically are, by design, discrete stepping devices. Methods exist to allow micropositioning in each full step, however, these microsteps still experience some inaccuracy due to variations in manufacturing tolerances. Closed loop control of a stepper motor is possible but rare. A number of the different permutations that are known in the art may be employed in the inventive system including:

Stepper Motor-Open Loop—Direct Drive of screw;
Stepper Motor-Open Loop—Indirect Drive of screw via gear train;
Stepper Motor-Open Loop—Indirect Belt Drive of screw via gear train;
Servo Motor-Closed Loop—Direct Drive of screw;
Servo Motor-Closed Loop—Indirect Drive of screw via gear train;
Servo Motor-Closed Loop—Indirect Belt Drive of screw via gear train
Servo Motor-Closed Loop—Direct or indirect drive using linear motor
Servo Motor-Closed Loop—Direct or indirect drive using piezo/ultrasonic motor
Servo Motor-Closed Loop—Direct or indirect drive using voice coil drive A stepper motor is defined as any motor that moves in specific steps or fractions of a step. A servo motor is any motor that has a feedback device that can move such that the position of the motor is governed by the feedback device. Feedback devices are important because there can be errors in the motion of the system, as well as a need for positioning to control electric motor operation—accurately compensating for them is important. As described in more detail below, precision control of motor operation is provided through the use of a linear encoder 113 that encodes the true position of the syringe plunger. This is in contrast to similar pump modules currently on the market, which evaluate pump performance by monitoring the rotation of the motor, usually upstream of any gear train. The prior art approach tends to compound any motor variations with errors from the gear train, mechanical structure and mechanisms. In contrast, the inventive device uses a high resolution linear encoder directly coupled to the plunger to determine the true position of the plunger, thus allowing for precise fluid volume metering. Accordingly, it is an important advantage of the present invention to encode the true position of the syringe plunger. This high degree of control provides sub-micron accuracies in positioning.

Referring to FIGS. 1A and 1B, control logic system 110 includes a system controller, i.e., a CPU and associated memory, which generates control signals for operating the motors and valves in accordance with preprogrammed commands, or commands received by some form of communication bus or other logic triggers, in combination with feedback signals associated with the different modules within the assembly. In additional to operational data, the control logic system may include programming for receiving environmental data to allow compensation for possible variations induced by environmental conditions. For example, a temperature detection device may be included in each module to provide feedback to a temperature compensator or controller.

The system controller may operate in conjunction with a computer or external controller. Alternatively, it may operate based on internally stored instructions in sequences that are either timed or based on certain input line triggers. In one embodiment, the control system 110 is used to control brushless motors with Hall effect sensors that manage the motors field commutation. The motors are driven using a torque control loop. The position loop that drives the syringe motors uses a linear encoder 113 (or other linear measuring device) as the feedback element. The linear encoder 113 is a commercially-available device. An example of an appropriate device is the EM1 or EM2 transmissive optical encoder module available from US Digital®. To further improve resolution, a second encoder can be utilized in tandem such as a rotary encoder connected to the shaft of the drive motor prior to any gearing. This encoder can be used to further sub-divide the accurate positions defined by the linear encoder in such a fashion that accuracy and resolution are both enhanced significantly. Encoders incorporated in the assembly may be based on a variety of measuring techniques, e.g., optical or magnetic, which devices are known in the art, and may employ image detectors and image analytics to obtain and generate linear and rotary position data.

Figure 4:
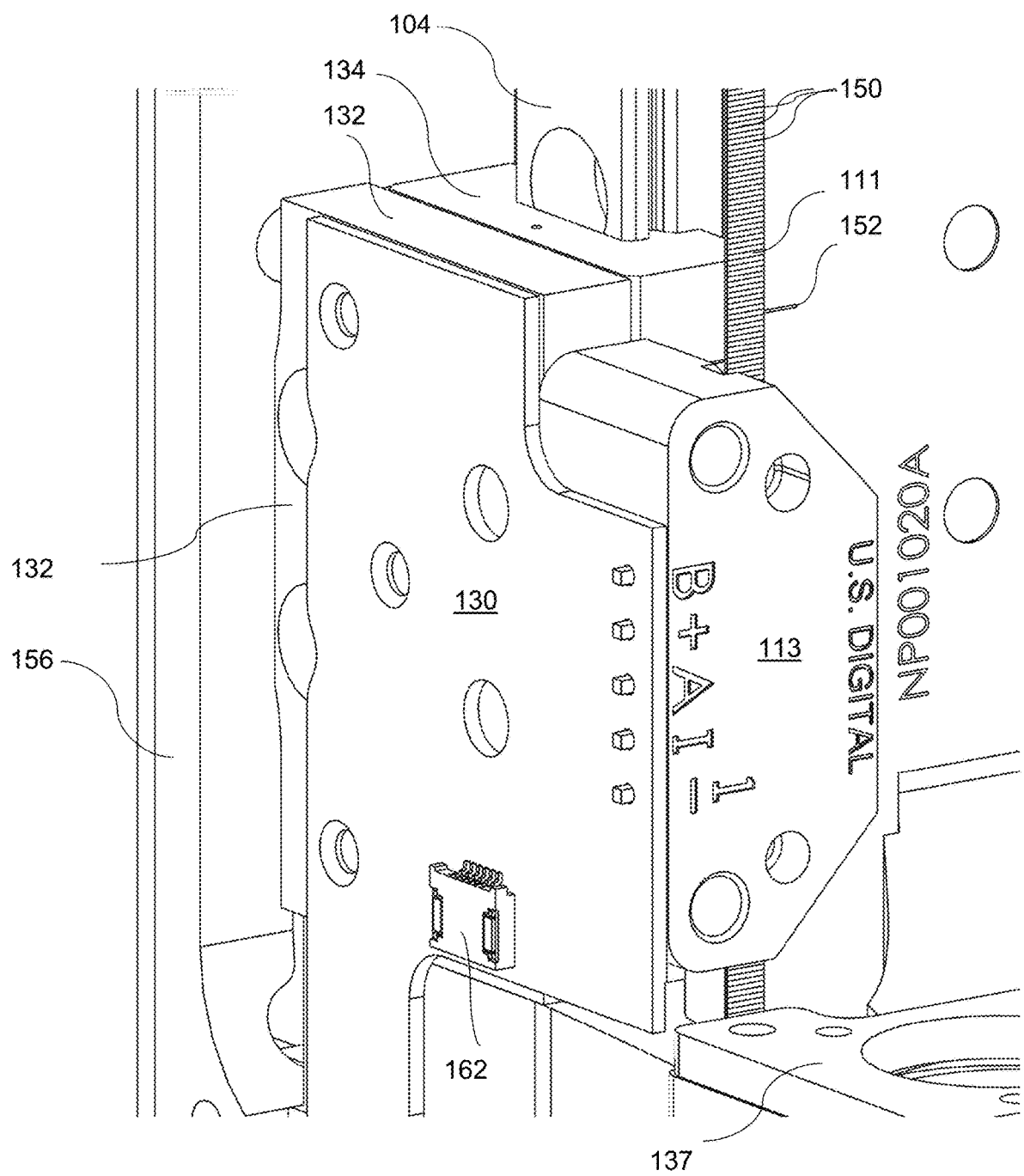
FIG. 4 is a perspective view of the an embodiment of the encoder read head assembly.

Referring to FIG. 4, additional details of the plunger assembly and linear encoder system for precision syringe operation are shown. While a linear slide embodiment of FIGS. 1A, 1B, 2A and 3 is illustrated, a similar arrangement may be used with the precision shaft embodiment of FIGS. 1D, 1E and 2B.

In the plunger carriage assembly, linear encoder read head 113 is mounted on upper carriage bracket 132 with electrical connection to carriage circuit board 130. Communication between circuit board 130 and control logic system 110 is provided via a conventional flat ribbon cable (not shown) attached to connector 162, which, as shown, is a standard 6-pin connector. Upper carriage bracket 132 is attached to linear guide bearing block 134 which is slidably mounted on linear slide 104. Linear encoder tape 111 is mounted in a fixed relationship to slide 104, positioned to be optically read by linear encoder read head 113 as the carriage assembly moves up and down along the slide 104. Optical markings 150 identify the degree of precision for measuring movement of the carriage assembly.

When the syringe pump assembly 100 is powered up, a homing sequence is initiated during which the slotted opto sensor 140 is used to control the direction of homing to find the precision home marking (index pulse) 152 along encoder tape 111. After the index position is found, motion is precisely controlled by counting the optical or other gradations 150 on linear encoder tape 111 as they pass under the read head 113. The level of resolution provided by the encoder tape is determined by the number of increments or markings on the tape (or other substrate on which the gradations 150 are formed), which, for purposes of the present invention may range for 2400 increments to 45,000 and higher. One example of a linear encoding tape that may be used in the inventive device is the LIN transmissive linear strip available from US Digital®.

Figure 7:
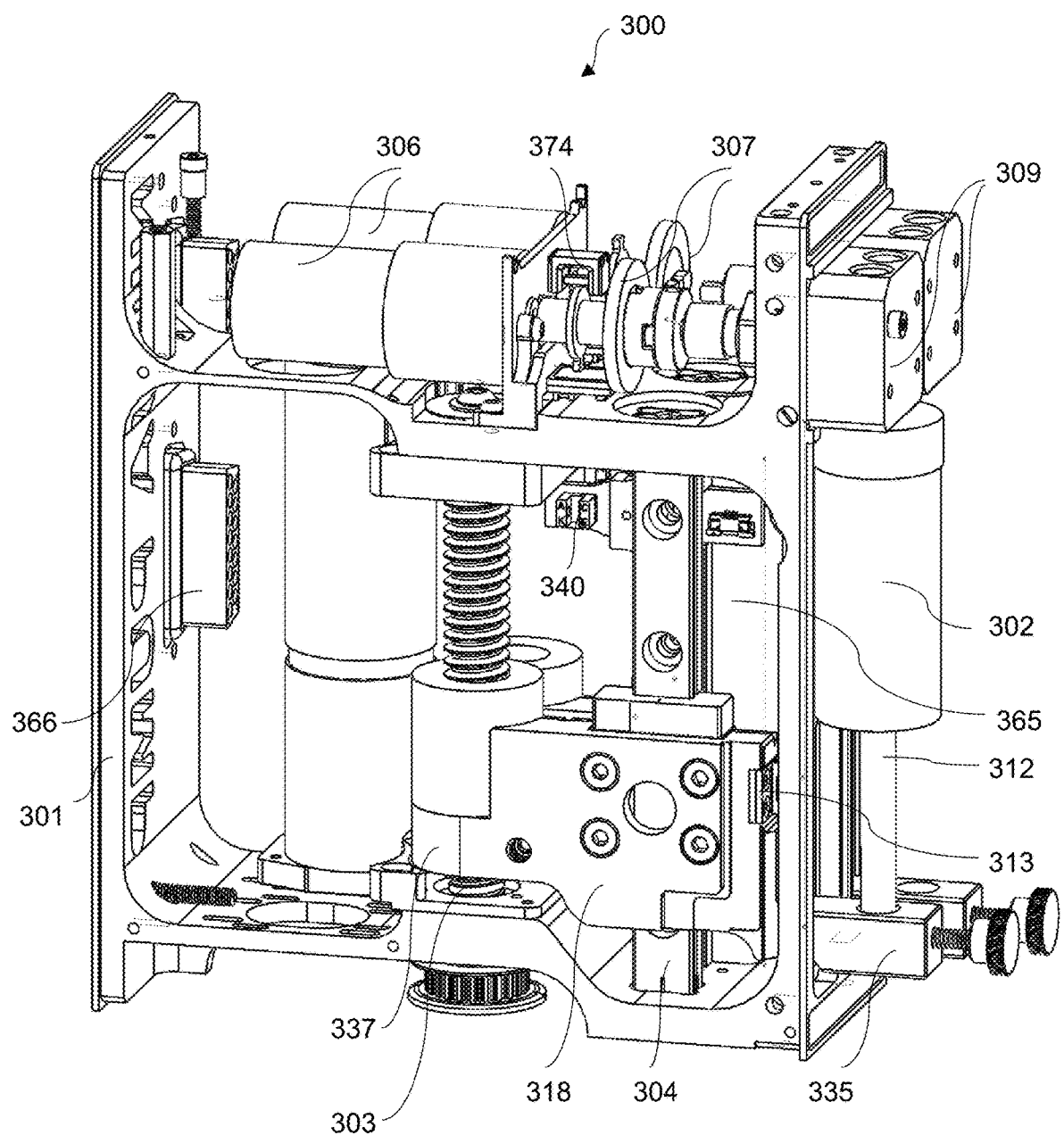
FIG. 7 is a perspective view of a third embodiment of the syringe pump assembly.
Figure 8:
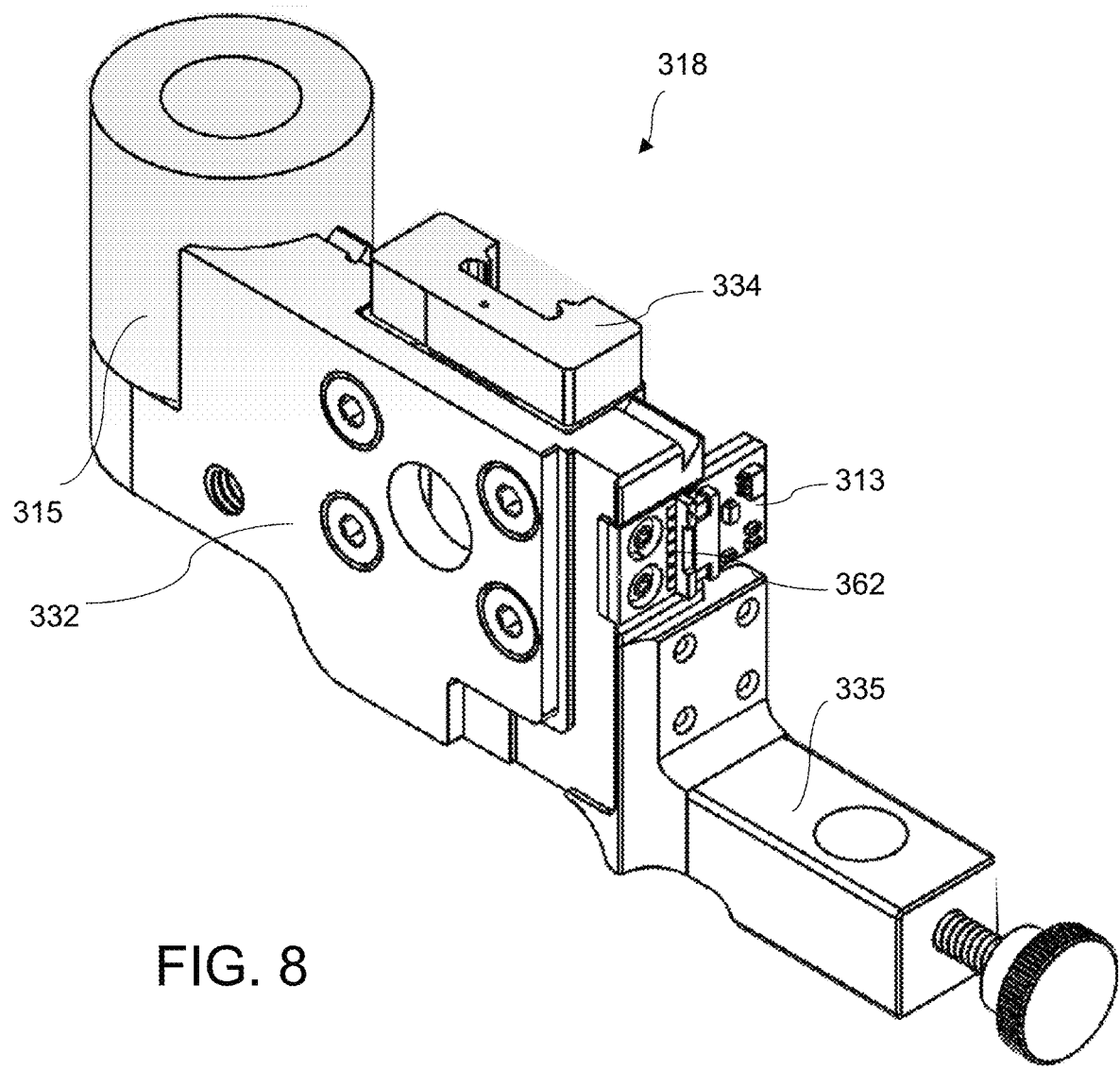
FIG. 8 is a perspective view of the carriage assembly of the embodiment of FIGS. 5-7.

FIGS. 7 and 8 illustrate another embodiment of the syringe pump assembly 300 and carriage assembly 318. The overall construction is similar to that of the embodiment of FIGS. 1A, 1B, 2A and 3, with the same frame 301, valves, syringes 302 and plunger 312, linear slide 304, lead screw 303, control logic system (not shown) and motors. The differences in this embodiment lie primarily in the linear encoder arrangement, which can be seen in detail in FIG. 8. The carriage assembly 318 includes lead nut 315, which is driven by the rotation of lead screw 303. Carriage bracket 332 attaches to linear guide bearing block 334, which slides up and down along linear rail 304. Syringe slide 335 includes an opening through which syringe plunger 312 extends to be fixed into place by set screws. One example of linear rail and bearing block that may be used in the inventive device is the ML9C1S1 and LWL9R29BS from IKO Nippon Thompson. Linear encoder read module 313 is mounted on the side of carriage bracket 332 to optically read a linear encoder tape (not shown) located on support 365 to which linear slide 304 is mounted. Connector 362 provides the connection to a flat ribbon cable to provide feedback signals from the linear encoder to the control logic system. In this embodiment, an optical sensor 340 is mounted in a fixed position relative to slide 304 to detect the location of the carriage assembly 318 to provide coarse homing information. An example of linear and rotary magnetic encoder that may be used in the inventive device is RLB linear miniature PCB level incremental magnetic encoder from RLS (Slovenia), a Renishaw plc company.

The use of encoders (linear or rotary) or other position measuring devices enables accurate sensing of the true position, kinematic, and/or relative motion of the syringe plunger. Using this feedback data, the system controller within control logic system 110 can implement a positioning algorithm, which may be stored in the associated memory, to perform pattern recognition and execute learning algorithms as are known in the art, for example, neural networks, support vector machines, heuristic, predictive methods, or extrapolative methods, or to incorporate methods such as look-up tables and other algorithms (also stored in memory) to compensate for various physical factors, such as environmental conditions (e.g., temperature, humidity, atmospheric pressure), and variations including specific structural rigidity, fluid dynamics and other characteristics of the liquids being handled, e.g., fluid compressibility factors and dissolved gases, as well as characteristics of the materials being used to handle the liquid, and mixtures of varying physical properties. The positioning algorithm may be used to generate a look-up table, a map, or otherwise control the system controller in such a manner as to operate the pump using a non-linear motion, thus accounting for detected variations. Use of this type of adaptive approach can be considered a "map-type" approach, where a system can be calibrated by modelling, by observation, or a combination thereof. A series of tables can be created for use in compensating for any non-linearities or edge effects. These look-up tables or maps can be relatively static, or they can be dynamic— actively updated and fine-tuned as more data is collected. Active updating provides the additional benefit of detecting and compensating for possible changes in system performance with time.

Referring to FIGS. 1A-1C, a separate valve drive 106 is provided to drive mechanical operation of each valve 109. Valves can be driven in different ways, with a stepper motor, a servo motor, or a simple pinch valve which compresses the tubing to form and uniform seals or obstructions in the pathway. The valve drive 106 as illustrated includes a motor with an optical encoder 107. Note that not all pumps have integrated valves and drives.

Figure 5:
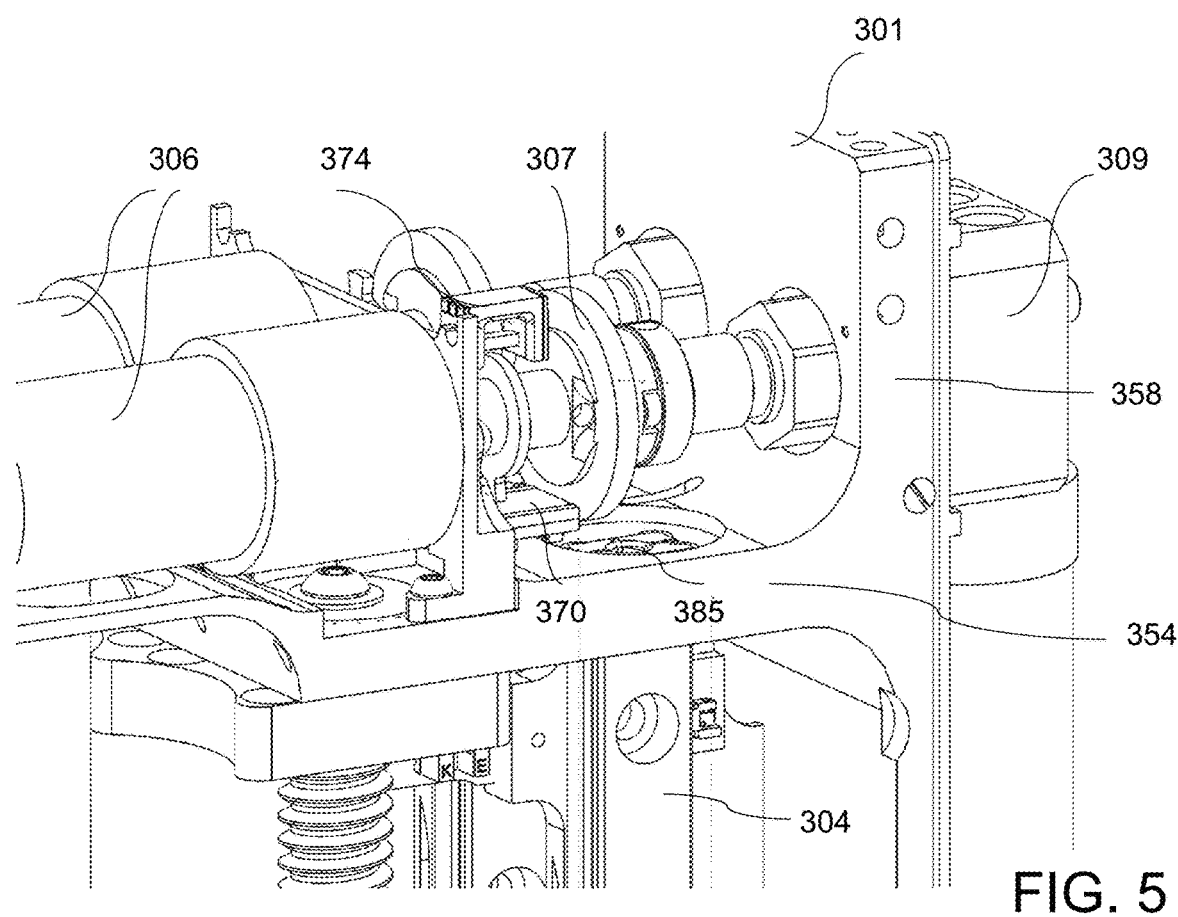
FIG. 5 is a partial perspective view of a third embodiment of the syringe pump assembly showing details of the valve drive assembly.

FIG. 5 illustrates an embodiment incorporating a valve drive 306 mounted on support plate 354 (within frame 301) for each valve 309 and a high resolution rotary encoder disc 307 that is read by rotary encoder read head 370 for control of valve operation. A slot sensor 374 detects a slot in the encoder disc 307 for provide absolute position sensing. Each sensor is connected to the control logic system (not shown) by a standard cable connection (now shown).

Valves are optional components as some syringes do not include a valve drive. The valve provides for selection of in and/or out port positions to allow fluid to flow into and out of the different ports. Some valve assemblies will include the ability to direct the flow of fluid from each syringe to two or more paths. For example, a fluid may need to flow into a needle that dispenses fluid, the source of the fluid may be a stock bottle. In this case, the valve may be driven to select the fluid bottle and an aspiration operation (sucking) commences, after the correct amount of fluid is taken the sucking process (moving the plunger) is stopped and the valve position is switched to shunt the syringe contents to the dispensing needle. Selection of appropriate valve materials for the intended application is within the level of skill in the art. Exemplary valve materials may include PCTFE (polychlorotrifluoroethylene), sometimes referred to as Kel-F® or Neoflon®, PTFE (polytetrafluoroethene) (Teflon™), PEEK (polyetheretherketone), UHMWPE (ultra-high-molecular-weight polyethylene), or other polyethylenes. Fittings may include standard ¼-28 tubing ports and ¼-28 syringe fittings. The valve assembly is preferably separable from the body of the assembly to allow user replacement of the valve.

Referring again to FIGS. 1A-1C, gear train 108, which is attached to main chassis 101, provides a number of functions including converting rotary motion to linear motion, matching a load to a drive (high speed low torque is converted to low speed high torque); improving accuracy of positioning. A series of gears, i.e., a transmission, as is known in the art, may be included convert multiple revolutions of a motor to a smaller fraction of a revolution to provide fine control. The gear train 108 will typically include two or more elements. In the case of the illustrated embodiment, there is a gearhead on motor 105, a pair of pulleys that can have different diameters, and the pitch of the leadscrew 103, each of which can be selected to provide the desired degree of control.

One or more external communication and power ports are provided for interfacing with laboratory instruments and systems. Interfaces may include RS-485 and RS-232 industry standard with baud rates of 9,600 to 38,400 to be controlled via OEM or data terminal protocol. Industry-standard DB-9, DB-15, USB, or similar connectors, in various combinations, may be used to provide data interfaces and power connections. See, for example, DB-15 ports 166 and 366 in FIGS. 1C and 7, respectively. Note that, while not specifically illustrated, multiple ports of a variety of standards may be provided on a single module.

Figure 6:
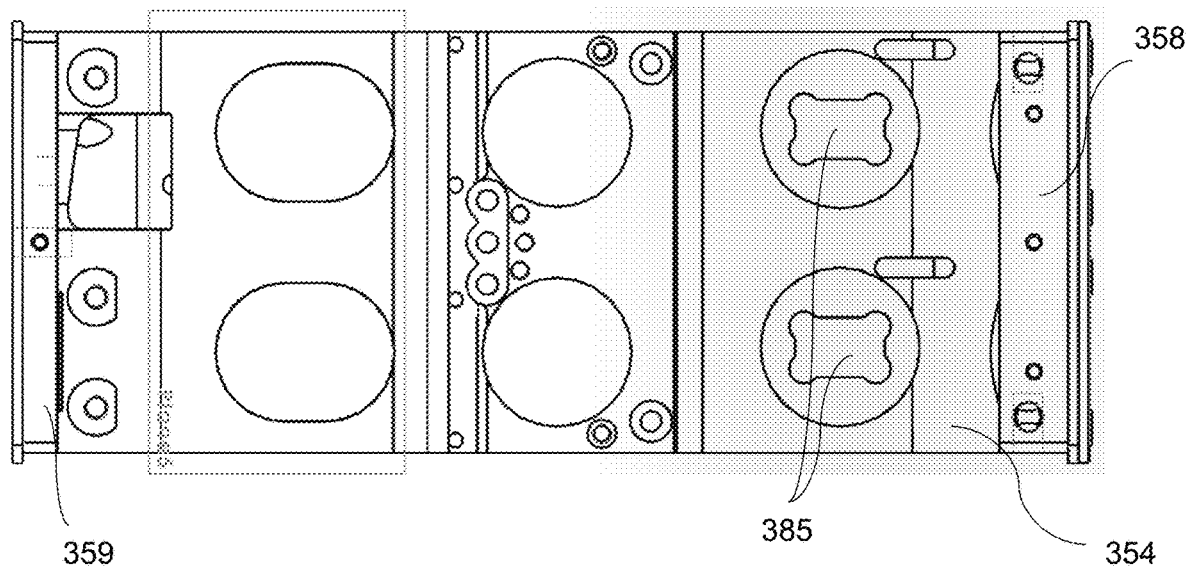
FIG. 6 is a top plan view of a horizontal support plate within the pump assembly frame.

An important feature of the construction of the inventive syringe pump assembly is the minimization of thermal variations among multiple pump channels. The embodiment of FIGS. 5 and 6 illustrates a mechanical construction feature that helps minimize the effects of thermal expansion differentials within the frame structure. Horizontal plate 354 extends between vertical frame components 358 and 359 of frame 301 to provide a mounting surface for the valve drive assembly. In the preferred embodiment, the frame 301 is formed from a single piece of material, for example, a 6000 series aluminum alloy such as 6061-T6 aluminum (CTE (linear)=23.6-25.2 µm/m-° C.), or plastic/polymer, by molding or machining. Horizontal plate 354 serves as the upper retention for linear rail 304. Opening 385 formed in plate 354, shaped to match and closely fit the rail cross-section, receives the upper end of rail 304. This method of construction controls any thermal expansion mismatch that may occur between the materials used to form the frame and the material of which rail 304 is formed.

The inventive pump assembly is configured as a modular plug-in for use with OEM laboratory systems, providing for expanded utility of existing systems that were originally designed for single standard pumps to include two fully independent channels. The pump module features industry-standard dimensions, mounting, power and protocols. Typical module dimensions are 127 mm (5.0 in) high×44.5 mm (1.8 in) wide×133 mm (5.2 in) deep, which conform to industry standard dimensions.

Other elements and features of the inventive modular multi-channel syringe pump will be readily apparent from the accompanying drawings, including elements not expressly mentioned herein.

The present invention provides a solution to the problem that arises when dispensing two or more liquids precisely with independently housed syringe pumps. The small, compact assembly of two (or more) pumping mechanisms, symmetrically fitted into a single chassis addresses issues of thermal expansion and manufacturing tolerances that can cause the relative displacement of the two (or more) syringes for similar operations to be different. The effect of temperature is identical on both pumping mechanisms as well as for manufacturing tolerance to be matched from bank to bank.

The inventive approach also provides a solution to the problems in independently controlling two or more syringes—specifically the difficulties in synchronizing independent controllers to perform similar or complementary functions. This is because the controllers are physically or logically independent of one another. The inventive approach controls all pumps with the same controller in such a manner as to cause synchronization of motion and, thus, fluid flow. Further, the housing (frame) of both banks of syringes in the same assembly causes any changes in dispensing to be matched due to the fact that both mechanisms are at the same temperature and manufactured to the same tolerances.

The inventive multi-channel syringe pump assembly offers a continuous precision metered dispensing rate. Because the channels are linked by the same control system, both channels can be fully synchronized so that accelerating one channel as the other channel is decelerating, allowing complete synchronization of the flow rates. No other pump offers one control driving two or more independent channels. This offers continuous flow because it is possible to ping-pong one channel against the other.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus, the following claims are hereby incorporated into the detailed description, with each claim standing on its own as a separate example embodiment or aspect. It is contemplated that various embodiments or aspects described herein can be combined or grouped in different combinations that are not expressly noted in the detailed description. It is further contemplated that claims covering such different combinations can similarly stand on their own as separate example embodiments or aspects, which can be incorporated into the detailed description.

The invention claimed is:

1. A multi-channel syringe pump assembly comprising:
a single chassis comprising a pair of vertical plates and a pair of horizontal plates linking the vertical plates;
two or more syringe banks mounted in parallel within the chassis, each syringe bank comprising:
a syringe disposed on a first vertical plate of the pair of vertical plates, the syringe configured for retaining a fluid in a chamber, the syringe comprising a syringe plunger configured for drawing the fluid into or forcing the fluid out of the chamber;
a syringe drive actuator comprising a syringe drive motor and a mechanical linkage configured for activating the syringe;
at least one position sensor configured for detecting and generating a position signal indicative of a position of the syringe plunger; and
a single controller for receiving the position signal for each syringe bank and generating control signals for independent operation of each of the two or more syringe banks;
wherein the syringes and syringe drive actuators of the two or more syringe banks are symmetrically disposed relative to each other within the single chassis, and wherein the single chassis is an integrated assembly configured to thermally connect the two or more syringe banks so that thermal mismatch is minimized and dispensing volumes are matched among each of the two or more syringe banks.

2. The assembly of claim 1, wherein the at least one position sensor comprises a linear motion sensor configured for measuring relative movement of the syringe and the syringe plunger.

3. The assembly of claim 2, wherein the linear motion sensor comprises an optical encoder disposed on the mechanical linkage of the syringe drive actuator configured for detecting gradations on an encoder tape disposed in a fixed relationship to the chassis.

4. The assembly of claim 1, wherein the at least one position sensor comprises an optical detector disposed in a fixed relationship to the chassis and configured for detecting a position of a portion of the mechanical linkage of the syringe drive actuator.

5. The assembly of claim 1, wherein the mechanical linkage comprises a bearing block configured to slidably move along a linear rail fixedly mounted relative to the chassis.

6. The assembly of claim 1, wherein the mechanical linkage comprises a bearing block configured to slidably move along a round shaft fixedly mounted relative to the chassis.

7. The assembly of claim 1, wherein the motor is configured to axially rotate a lead screw, and wherein the mechanical linkage comprises a lead nut configured to convert rotation of the lead screw to vertical motion of the mechanical linkage relative to the chassis.

8. The assembly of claim 1, wherein each syringe bank further comprises a valve assembly in fluid communication with the syringe, the valve assembly configured for controlling flow of fluid from the syringe, the valve assembly including a valve in fluid communication with at least one valve port.

9. The assembly of claim 8, wherein the valve assembly further comprises a valve encoder configured to sense a position of the valve relative to the at least one valve port.

10. The assembly of claim 8, further comprising one or more valve actuators configured to activate the valve assembly.

11. The assembly of claim 8, wherein the valve assembly is removably and replaceably attached to the syringe bank.

12. The assembly of claim 1, wherein each syringe bank is separately electronically addressable to be driven in concert or independently by the controller.

13. A multiple syringe pump assembly, wherein multiple assemblies of claim 1 are addressed electronically by an external computing device, wherein each assembly has a distinct electronic address for independent control of the assembly.

14. The assembly of claim 1, wherein the syringe is removably and replaceably disposed within the syringe bank.

15. The assembly of claim 1, wherein the syringe drive actuators of the two or more syringe banks are configured to respond identically to thermal effects within the assembly.

16. The assembly of claim 1, wherein the two or more syringe banks are disposed within the chassis in a mirror-symmetric configuration.

17. The assembly of claim 1, wherein the two or more syringe banks are disposed within the chassis using translational symmetry.

18. The assembly of claim 1, wherein the controller comprises a processor and an associated memory having instructions stored therein to cause the processor to execute a positioning algorithm using the position signal for controlling operation of the syringe drive actuator based on one or more of a lookup table and a map.

19. The assembly of claim 1, wherein the controller executes an algorithm to link actuation of one syringe to actuation of at least one other syringe.

20. The assembly of claim 1, wherein the controller comprises a processor and an associated memory having instructions stored therein to cause the processor to execute a control logic to generate the control signals for adaptively and independently controlling operation of the syringe drive actuators to compensate for one or more of pump non-linearities, physical variations, fluid variations, and environmental variations.

21. The assembly of claim 20, further comprising sensing devices configured for generating feedback signals, wherein the control logic comprises one or more of look-up tables, maps, and algorithms.

22. The assembly of claim 21, wherein the algorithms comprise adaptive learning algorithms.

23. A method for controlling a syringe pump assembly comprising two or more syringe banks disposed within an integrated chassis, each syringe bank having a syringe actuator comprising a syringe drive motor and a mechanical linkage configured for activating a syringe for drawing a fluid into or forcing a fluid out of a syringe chamber, and a position sensor, wherein the assembly comprises a controller configured for independent control of each of the two or more syringe banks, the controller comprising a processor and an associated memory having stored therein executable instructions for the processor, the method comprising:

executing within the processor a control logic to generate the control signals for adaptively and independently controlling operation of each syringe bank to compensate for one or more of pump non-linearities, physical variations, fluid variations, and environmental variations, wherein the control logic executes a positioning algorithm using a position signal from the position sensor for independently controlling operation of the syringe drive actuators based on one or more of a lookup table, a map, and an adaptive algorithm.

24. The method of claim 23, further wherein the assembly further comprises sensing devices configured for generating feedback signals, wherein the control logic further causes the controller to compensate for variations in physical properties and fluid characteristics indicated by the feedback signals.

* * * * *